(12) United States Patent
Butscher et al.

(10) Patent No.: US 11,556,728 B2
(45) Date of Patent: Jan. 17, 2023

(54) MACHINE LEARNING VERIFICATION PROCEDURE

(71) Applicant: SAP SE, Walldorf (DE)

(72) Inventors: Stefan Butscher, Sandhausen (DE); Frank Krueger, Heidelberg (DE)

(73) Assignee: SAP SE, Walldorf (DE)

( * ) Notice: Subject to any disclaimer, the term of this patent is extended or adjusted under 35 U.S.C. 154(b) by 1072 days.

(21) Appl. No.: 16/216,265

(22) Filed: Dec. 11, 2018

(65) Prior Publication Data

US 2020/0184253 A1     Jun. 11, 2020

(51) Int. Cl.
*G06K 9/62* (2022.01)
*G06N 20/00* (2019.01)
*G06V 10/98* (2022.01)

(52) U.S. Cl.
CPC ......... *G06K 9/6201* (2013.01); *G06K 9/6262* (2013.01); *G06N 20/00* (2019.01); *G06V 10/98* (2022.01)

(58) Field of Classification Search
CPC .................................................. G06K 9/6201
See application file for complete search history.

(56) References Cited

U.S. PATENT DOCUMENTS

| | | | |
|---|---|---|---|
| 9,043,738 B1 | 5/2015 | Ward | |
| 9,443,268 B1* | 9/2016 | Kapczynski | G06Q 30/04 |
| 9,449,281 B2 | 9/2016 | Basel | |
| 9,973,465 B1* | 5/2018 | Linkous | H04L 51/234 |
| 10,033,611 B1* | 7/2018 | Linkous | H04L 67/1095 |
| 11,256,732 B2* | 2/2022 | Weiss | G06N 20/00 |
| 11,429,712 B2* | 8/2022 | Ortiz | G06V 10/17 |
| 2014/0178084 A1 | 6/2014 | Kuo | |
| 2016/0217406 A1* | 7/2016 | Najmi | G06Q 10/06315 |
| 2016/0239813 A1* | 8/2016 | Ko | G06Q 30/0215 |
| 2018/0225667 A1* | 8/2018 | Wang | G06N 20/00 |
| 2018/0239501 A1 | 8/2018 | Reddy | |
| 2018/0247227 A1* | 8/2018 | Holtham | G06V 30/1914 |
| 2019/0005408 A1* | 1/2019 | Tolpin | G06N 3/08 |
| 2019/0012733 A1* | 1/2019 | Gorman | G06Q 40/12 |
| 2019/0138384 A1* | 5/2019 | Nair | G06F 16/27 |

FOREIGN PATENT DOCUMENTS

| | | |
|---|---|---|
| CN | 103527769 | 1/2014 |
| KR | 101852527 | 6/2018 |

\* cited by examiner

*Primary Examiner* — Irfan Habib
(74) *Attorney, Agent, or Firm* — Mintz Levin Cohn Ferris Glovsky and Popeo, P.C.

(57) ABSTRACT

Systems, methods, and techniques to efficiently and effectively verifying and calibrating a machine learning model. The method can include training a machine learning model by at least processing training data with the machine learning model. The method can further include manipulating a first data set of the training data and applying the manipulated first data set to the machine learning model to thereby determine a first matching rate. In addition, the method can include applying the manipulated first data set to a rule engine to thereby determine a second matching rate and determining a difference between the first matching rate and the second matching rate. The method can further include determining whether the difference is within a predefined threshold range and providing an error indication if the determined difference is outside of the predefined threshold range.

12 Claims, 7 Drawing Sheets

200

| Document | Company | Number | Amount | Customer Name | Date |
|---|---|---|---|---|---|
| Invoice | XYZ | 90112 | 477 USD | Peter Scott | 15.Oct 2018 |

| Document | Memo line | Amount | Payer Name | Payer Bank Details | Date |
|---|---|---|---|---|---|
| Payment | Payment for Invoice 90112 | 477 USD | Peter Scott | 77712/112244 5 | 22. Oct 2018 |

| Document | Memo line | Amount | Payer Name | Payer Bank Details | Date |
|---|---|---|---|---|---|
| Payment | Payment for Invoice 00090112 | 476 USD | peter scotty | 77712/112244 5 | 24. Oct 2018 |

FIG. 2C

MACHINE LEARNING VERIFICATION PROCEDURE

The subject matter described herein relates to various embodiments of a machine learning verification procedure.

BACKGROUND

Machine learning algorithms and models can be popular for business applications, such as for automating repetitive tasks (e.g., matching deliveries with orders or payments with invoices). Such machine learning models can learn from historic or training data. Some issues can be associated with using some machine learning models. For example, a machine learning model can be dependent on a quality of the training data. For example, special cases that have not occurred in the past may not be correctly solved by the machine learning model. Additional issues can include overfitting or underfitting. For example, in the case of overfitting, the machine learning model may incorrectly match data entries, such as entries that have some similarities but are not a correct match. An example of underfitting may include when a small difference between two data entries results in a non-match when such entries should have been considered a match. Furthermore, over time machine learning algorithms can require re-trainings. However, it can be difficult for users to determine when and if machine learning models require retraining. Such issues can counteract the automation benefits of machine learning and reduce acceptance and trust by users.

SUMMARY

This document presents systems, methods, and techniques to verify and calibrate a machine learning model. In one aspect, there is provided a system. The system may include at least one data processor and at least one memory. The at least one memory may store instructions that result in operations when executed by the at least one data processor. The operations may include training a machine learning model by at least processing training data with the machine learning model. The training data may include a plurality of invoice statements and a plurality of payment statements. The machine learning model can be trained to match an invoice statement of the plurality of invoice statements to a corresponding payment statement of the plurality of payment statements. The operations may further include manipulating a first data set of the training data and applying the manipulated first data set to the machine learning model to thereby determine a first matching rate. In addition, the operations may include applying the manipulated first data set to a rule engine to thereby determine a second matching rate and determining a difference between the first matching rate and the second matching rate. Furthermore, the operations may include determining whether the difference is within a predefined threshold range and providing an error indication if the determined difference is outside of the predefined threshold range.

In some variations, one or more features disclosed herein including the following features may optionally be included in any feasible combination. The first matching rate may include a first number of matches between invoice statements of the plurality of invoice statements and payment statements of the plurality of corresponding payment statements within the first data set. The second matching rate may include a second number of matches between invoice statements of the plurality of invoice statements and payment statements of the plurality of corresponding payment statements within the second data set. The predefined threshold range may include an acceptable difference between the first number of matches and the second number of matches. The operations may further include retraining the machine learning model if the determined difference is outside of the predefined threshold range. The manipulating the first data set may include changing at least one parameter of at least one of the invoice statements and the payment statements. The at least one parameter may include one or more of an invoice amount, a payment amount, an invoice number, and a customer name.

In another aspect, there is provided a method including training a machine learning model by at least processing training data with the machine learning model. The training data may include a plurality of invoice statements and a plurality of payment statements. The machine learning model can be trained to match an invoice statement of the plurality of invoice statements to a corresponding payment statement of the plurality of payment statements. The method may further include manipulating a first data set of the training data and applying the manipulated first data set to the machine learning model to thereby determine a first matching rate. In addition, the method may include applying the manipulated first data set to a rule engine to thereby determine a second matching rate and determining a difference between the first matching rate and the second matching rate. Furthermore, the method may include determining whether the difference is within a predefined threshold range and providing an error indication if the determined difference is outside of the predefined threshold range.

In another aspect, there is provided a computer program product that includes a non-transitory computer readable storage medium. The non-transitory computer-readable storage medium may include program code that causes operations when executed by at least one data processor. The operations may include training a machine learning model by at least processing training data with the machine learning model. The training data may include a plurality of invoice statements and a plurality of payment statements. The machine learning model can be trained to match an invoice statement of the plurality of invoice statements to a corresponding payment statement of the plurality of payment statements. The operations may further include manipulating a first data set of the training data and applying the manipulated first data set to the machine learning model to thereby determine a first matching rate. In addition, the operations may include applying the manipulated first data set to a rule engine to thereby determine a second matching rate and determining a difference between the first matching rate and the second matching rate. Furthermore, the operations may include determining whether the difference is within a predefined threshold range and providing an error indication if the determined difference is outside of the predefined threshold range.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the prediction of anomalies in the operations of a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2A depicts example training data including an invoice statement including a plurality of invoice parameters, in accordance with some example embodiments;

FIG. 2B depicts another example training data including a pay statement including a plurality of payment parameters, in accordance with some example embodiments;

FIG. 2C depicts an example modified training data including a modified pay statement including a plurality of modified payment parameters, in accordance with some example embodiments;

When practical, similar reference numbers denote similar structures, features, or elements.

DETAILED DESCRIPTION

Figure 1:
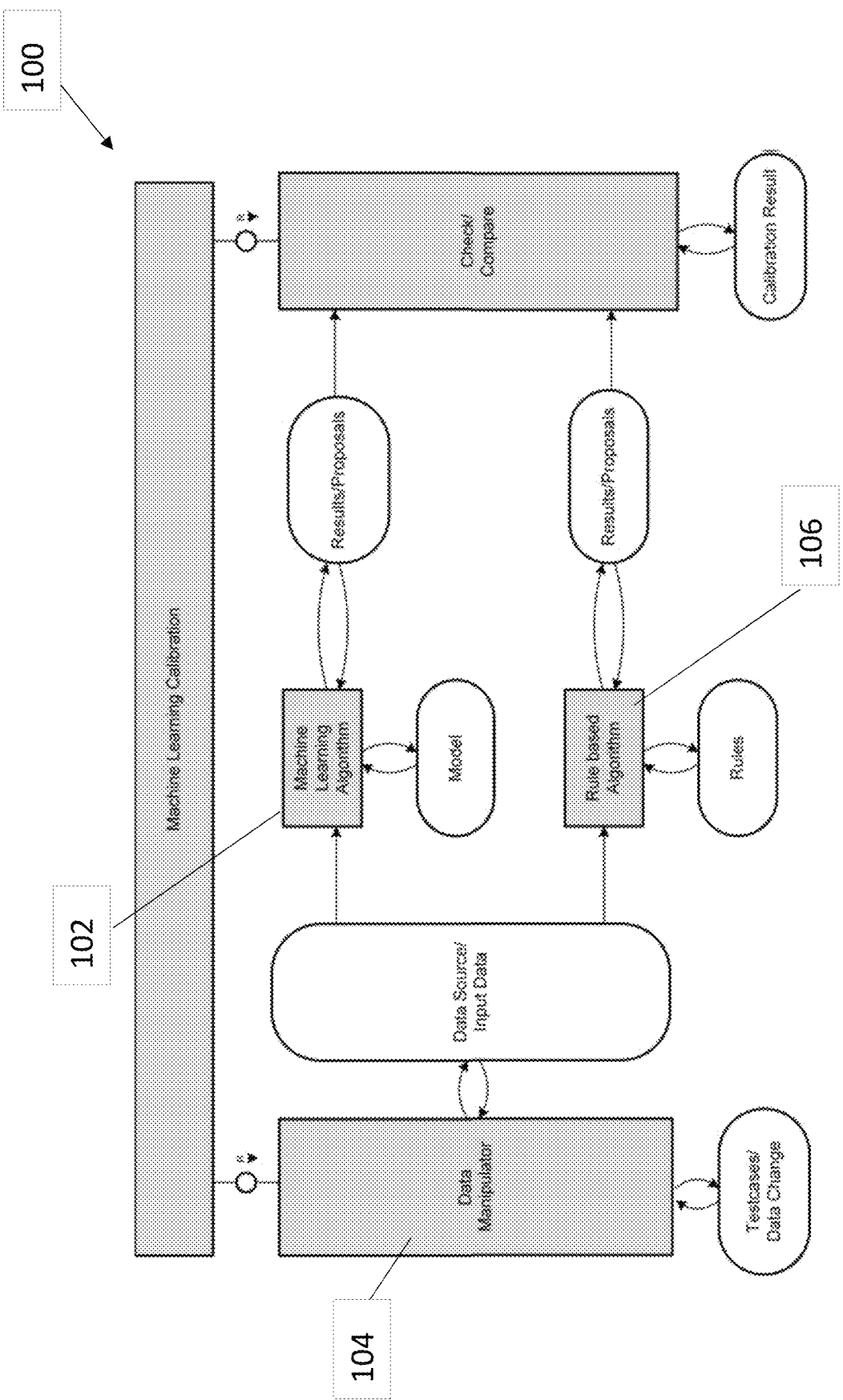
FIG. 1 depicts a system diagram illustrating a machine learning verification process flow, in accordance with some example embodiments.

The current subject matter is directed to systems and methods that include a machine learning verification procedure, and that can efficiently and effectively determine an accuracy of a trained machine learning model. In some embodiments, the machine learning verification procedure can provide for relearning of the machine learning model, such as when the machine learning model is found to be inaccurate. For example, the machine learning verification procedure can train a machine learning model, verify whether the machine learning model is working correctly or not, and/or assist with retraining the machine learning model (e.g., when the machine learning model is not working correctly). As such, the machine learning verification procedure can provide an efficient and effective way for users depending on information provided by the machine learning model to know if the machine learning model is working correctly or not. Furthermore, the machine learning verification procedure can provide information to a user regarding how the machine learning model is functioning compared to a standard rule engine, as well as information and/or assistance regarding retraining the machine learning model, as will be described in greater detail below. Various embodiments and features of the machine learning verification procedure are described herein.

In some embodiments, the machine learning model can be trained using training data that includes invoice statements and corresponding payment statements. The machine learning model can be trained to match payment statements with the correct corresponding invoice statements. As such, the trained machine learning model can assist a business with monitoring and managing issued invoices and received payments. However, to ensure that the machine learning model is correctly trained, the machine learning verification of the current subject matter can assist with verifying the effectiveness of the trained machine learning model, such as how accurate the invoice/payment statement matching is being performed. Furthermore, the machine learning verification procedure can assist with retraining the machine learning model, such as by providing an indication related to the inaccuracy of the machine learning model invoice/payment matching and/or assisting with retraining the machine learning model based on the determined inaccuracy of the machine learning model.

As will be described in greater detail below, some embodiments of the machine learning verification procedure include both traditional rule based algorithms and machine learning model to assist with verifying the accuracy of the machine learning model. As such, the machine learning verification procedure described herein can improve customer trust in using machine learning models, such as to assist with running a business, as well as provide an efficient and effective way to validate and calibrate a machine learning model. Various embodiments and examples of the machine learning verification procedure are described in greater detail below. The machine learning verification procedure can include a model, a process, a part of a system, etc., without departing from the scope of this disclosure.

FIG. 1 depicts a machine learning verification procedure 100 consistent with implementations of the current subject matter. As shown in FIG. 1, the machine learning verification procedure 100 can include a machine learning model 102 having at least one algorithm that can be trained with training data. For example, the training data can include invoice statements and corresponding payment statements. The machine learning model 102 can be trained to match invoice statements with their corresponding payment statements, such as for allowing a business to keep track of invoices that have been paid.

As shown in FIG. 1, the machine learning verification procedure 100 can include a data manipulator 104 that can be configured to manipulate the training data, such as modify one or more parameters associated with at least one data set of the training data. For example, the data manipulator 104 can change an invoice amount of an invoice statement and/or a payment amount of a payment statement and run such manipulated data through the machine learning model 102. In addition, the manipulated data can also be run through a rule engine 106 having at least one rule algorithm. Such modification and running of modified data can be performed multiple times to allow the machine learning model 102 to determine a first matching rate (e.g., a number of matches between invoice and payment statements determined each time the manipulated data is run) and the rule engine to determine a second matching rate (e.g., a number of matches between invoice and pay statements determined each time the manipulated data is run). As the modification of data increases, the matching rates can be expected to decrease.

The procedure of manipulating the data and applying both the machine learning model and the rules engine can be repeated and the matching rates in both cases can be saved for each iteration. As a result of this process, at least two matching rate curves for the two approaches can be produced (see, for example, FIG. 4 and FIG. 5). The curves can then be compared, such as by determining an absolute difference. In a case where the machine learning matching rates differ significantly (e.g., above a threshold) from the rules engine matching rates, a recommendation to redesign and retrain the machine learning model can be proposed. For example, the threshold and/or amount the matching rates are allowed to differ can be an individual business decision that can be made by the company applying the process. The matching rate decline curves can also provide an indication as to whether the machine learning model tends to overfit or underfit (see, for example, FIGS. 4—400 and FIG. 5—500).

Although the machine learning verification procedure 100 and machine learning model 102 are described herein with regards to matching invoice statements and payment statements, any number of data can be included in the training data. Furthermore, the machine learning verification procedure and machine learning model can perform any number of manipulations, analysis, etc. to such training data without departing from the scope of this disclosure. For example, the machine learning verification procedure can verify the accuracy of any number of machine learning models and assist with retraining the machine learning model, as necessary. Furthermore, the machine learning verification procedure and machine learning model can be include in any number of systems for processing various types and sizes of data.

FIGS. 2A-2C illustrate an embodiment of training data and modified training data that are consistent with implementations of the current subject matter. For example, FIG. 2A depicts an embodiment of an invoice statement 200 including a plurality of parameters, such as an invoice number, an invoice amount, a customer name, and an invoice date. In addition, FIG. 2B depicts an embodiment of a payment statement 202 including a plurality of parameters, such as an invoice reference note, a payment amount, a payee name, bank information, and a payment date. Other parameters are within the scope of this disclosure.

For example, the machine learning model can match the invoice statement 200 with the payment statement 202, thereby indicating that the invoice shown in FIG. 2A has been paid. As shown in FIGS. 2A and 2B, the parameters (e.g., amount, invoice number, payer/customer name, etc.) of the invoice statement 200 and payment statement 202 directly match.

Furthermore, FIG. 2C depicts a modified payment statement 204. As discussed above, the machine learning verification procedure can include a data manipulator 104 (as shown in FIG. 1) that can manipulate at least one parameter of the training data. As shown in FIG. 2C, the data manipulator 104 can manipulate the payment statement 202 such that the payment and invoice amounts and/or the payer name does not exactly match, as shown when comparing the invoice statement 200 to the modified payment statement 204. For example, a well-trained machine learning model can be expected to return similar results as the rule based approach. If the rule base approach matches the payment statement to the invoice statement then the machine model can be expected to also perform the same match. If the rule based approach does not perform a match, then the machine learning can be expected to also not perform a match. The machine learning verification procedure can determine deviations between the machine learning model and the rule based approach. An example of such verification by the machine learning verification procedure is described in detail below.

Figure 3:
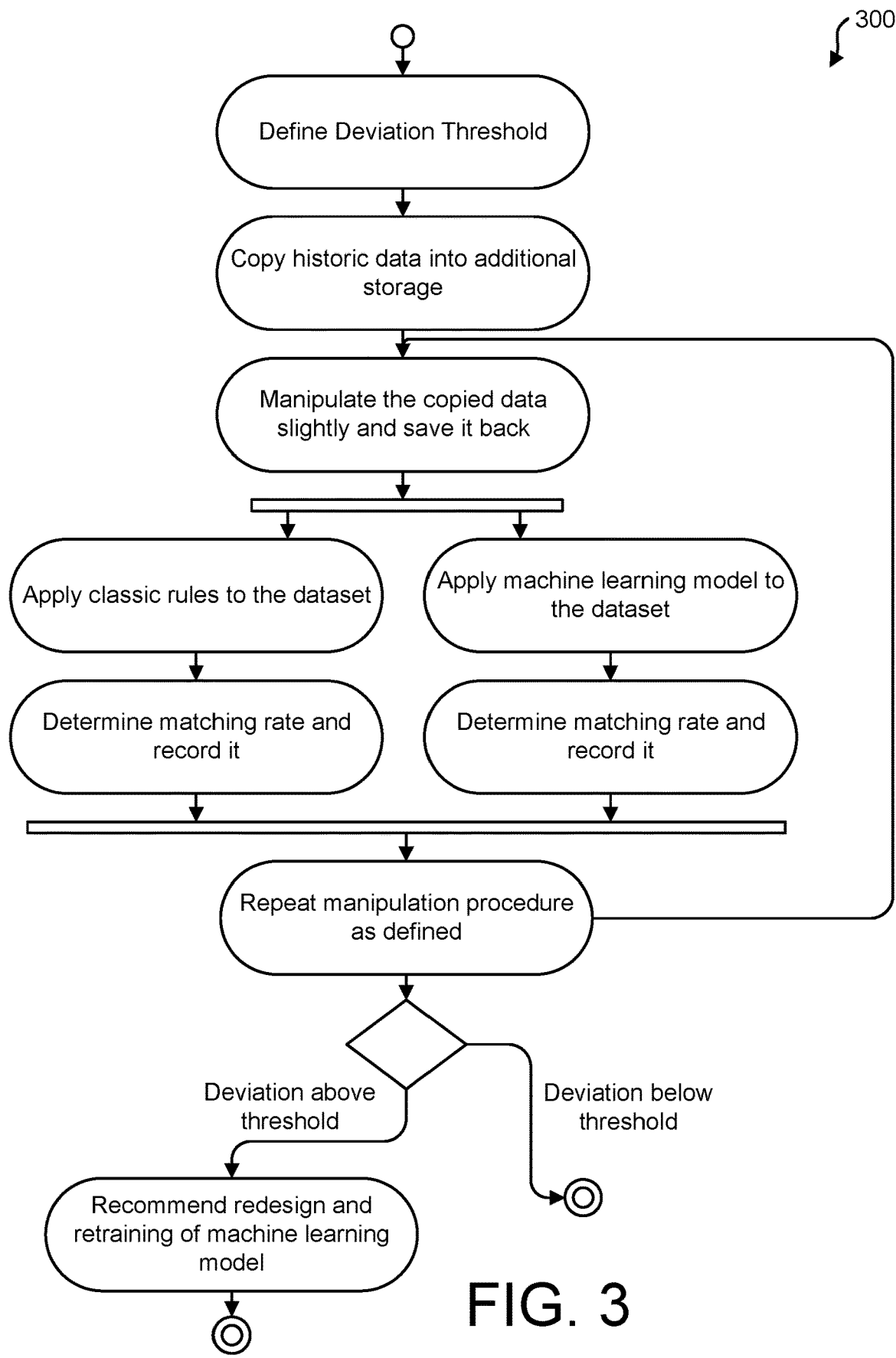
FIG. 3 depicts a flowchart illustrating a machine learning validation model process, in accordance with some example embodiment.

FIG. 3 illustrates a process flow 300 of the machine learning verification procedure that is configured to verify a machine learning model. As will be described in greater detail below, the machine learning verification procedure can modify a set of training data and run the modified data through the machine learning model to determine a first match rate. The machine learning model can also run the modified data through and a standard rule engine to determine a second match rate. The machine learning verification procedure can then compare the first and second match rates and record them. This procedure can be repeated, including further manipulating the data and recording the determined rates for both the machine learning model and the rule engine. After a number of iterations, the matching rate curves can be compared against defined thresholds. Furthermore, the machine learning verification procedure can indicate if the machine learning model is overfitting or underfitting. In some embodiments, the machine learning verification procedure can provide error information regarding the machine learning model to a user, as well as assist with retraining and calibrating the machine learning model.

As shown in FIG. 3, the machine learning verification procedure can include a deviation threshold, which can define an acceptable difference (e.g., 3%) between matching rates determined by the machine learning model and matching rates determined by the rule engine. In some embodiments, historical or training data can be copied to an additional data storage that can be used for the machine learning verification procedure process. For example, the machine learning verification procedure can take at least one (including all) historical payment-invoice statement matches and manipulate one or more parameters in either the payment statements or invoice statements.

In some embodiments, for every payment-invoice match, only one parameter is changed, e.g. the payment amount is reduced. Once manipulated, the modified data can be saved, such as for further processing. In some embodiments, changes to the data can be recorded to thereby identify what changes were done, which may assist in evaluating results in a later stage.

As shown in FIG. 3, the modified data can be run through the machine learning model to determine a first matching rate. In addition, the modified data can be run through the rule engine to determine a second matching rate. The first and second matching rates can be saved. Additionally, it can be expected that as the data is modified, the matching rate can decline. Such modification and running modified data through the machine learning model and rule engine can be repeated, including multiple times, which can create increasing deviations in the modified data, thus further declining the matching rates. The machine learning verification procedure can compare the declining matching rates between the machine learning model and rule engine. If the rates are similar (e.g., have the same or similar decline in matching rates), then the machine learning verification procedure can determine that the machine learning model is properly trained and can be relied upon. However, if the rates are not similar (e.g., do not have the same or similar decline in matching rates), then the machine learning verification procedure can determine that the machine learning model is not properly trained and cannot be relied upon. In such a case, the machine learning verification procedure may provide an error indication to a user providing information related to the machine learning model. For example, the machine learning verification procedure may provide an error indication informing a user that the machine learning model needs to be retrained. In some embodiments, the machine learning verification procedure can provide additional information regarding any errors associated with the machine learning model. For example, the machine learning verification procedure can indicate whether the machine learning model is overfitting or underfitting.

Figure 4:
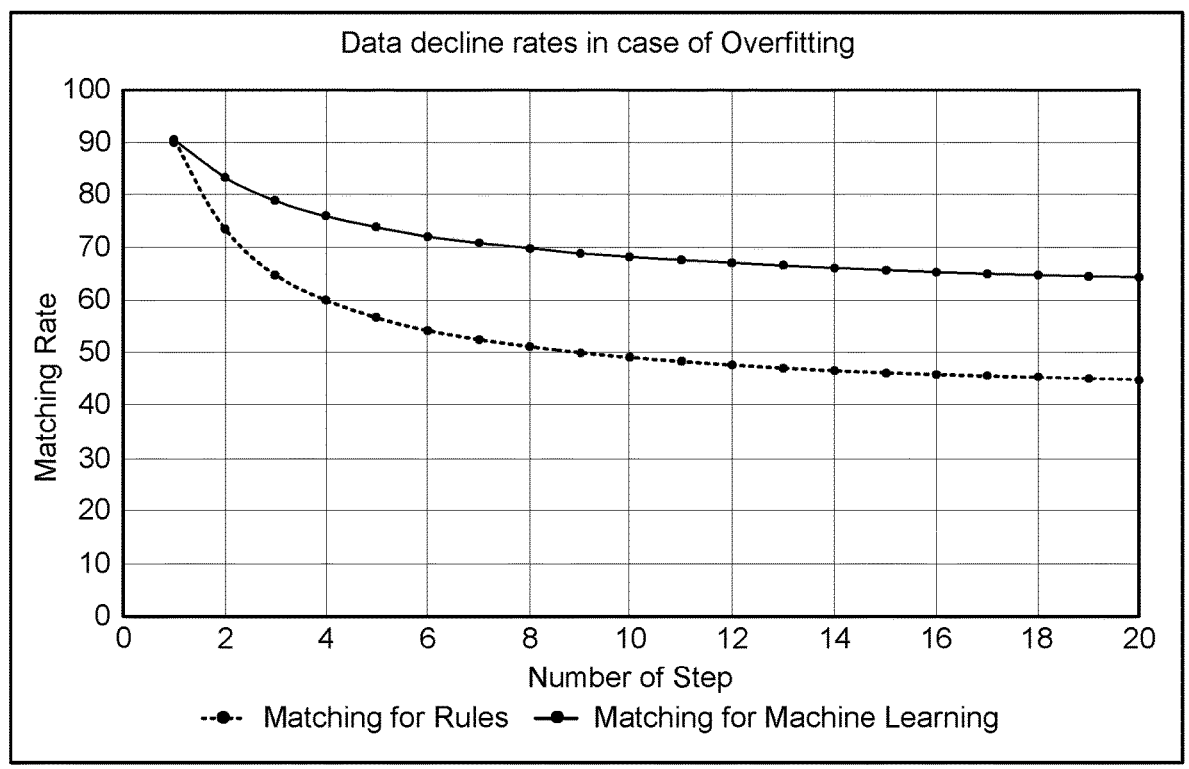
FIG. 4 depicts a first graph illustrating machine learning model having match rates that are overfitting, in accordance with some example embodiment.

FIG. 4 depicts a first graph 400 illustrating a machine learning model having matching rates that are overfitting compared to matching rates determined by the rule engine. The machine learning verification procedure can generate the first graph and can either provide information related to the first graph to a user or use such information to assist with retraining the machine learning model.

Figure 5:
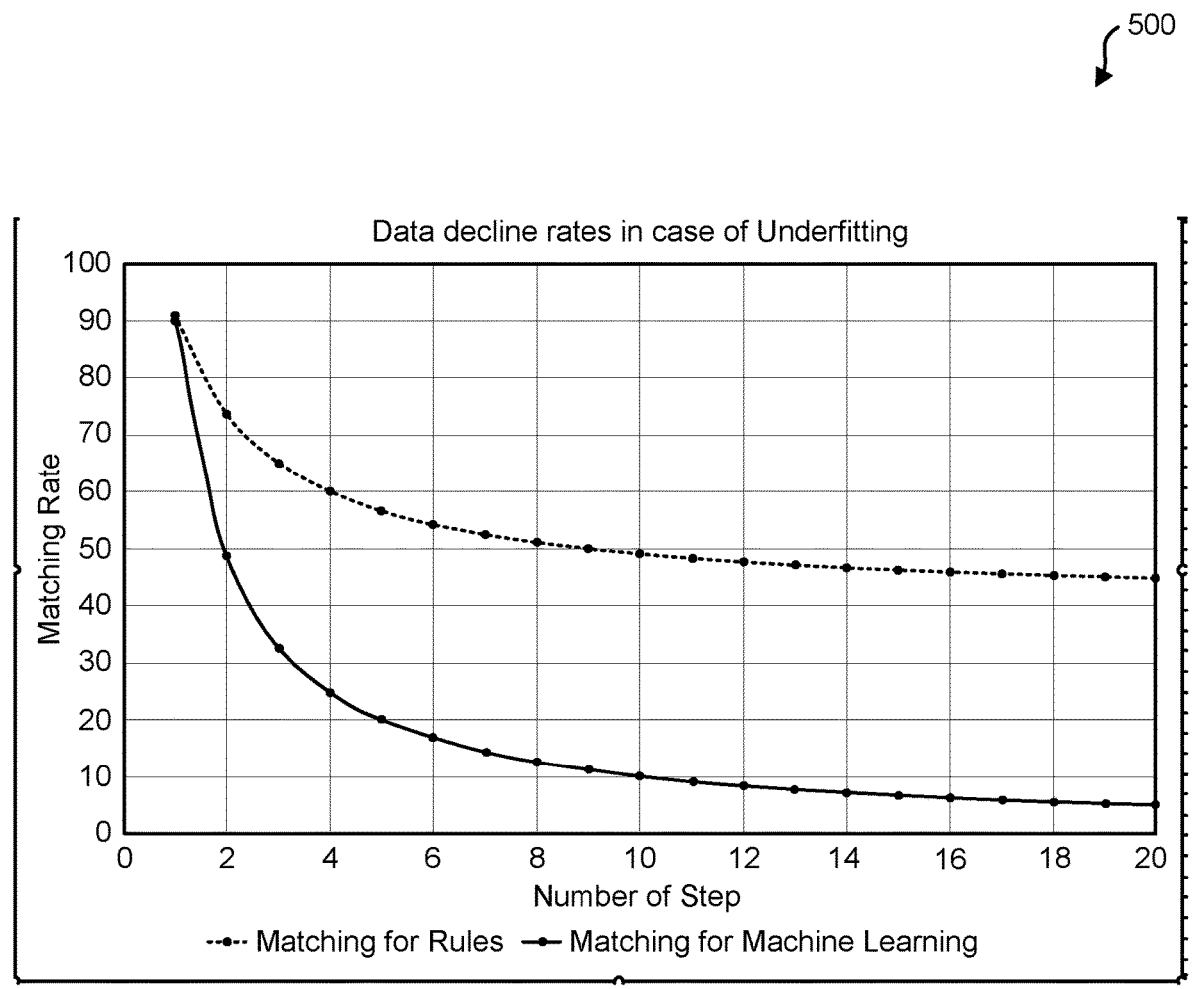
FIG. 5 depicts a second graph illustrating machine learning model having match rates that are underfitting, in accordance with some example embodiment.

FIG. 5 depicts a second graph 500 illustrating a machine learning model having matching rates that are underfitting compared to matching rates determined by the rule engine. The machine learning verification procedure can generate the second graph and can either provide information related to the second graph to a user or use such information to assist with retraining the machine learning model. In some embodiments the matching rate decline curves can also be recorded and used for comparison for the next calibration process. Even if all results are within defined thresholds, evaluating an evolution of the differences over time can be beneficial. For example, such evaluation can assist with determining and setting the threshold level.

Figure 6:
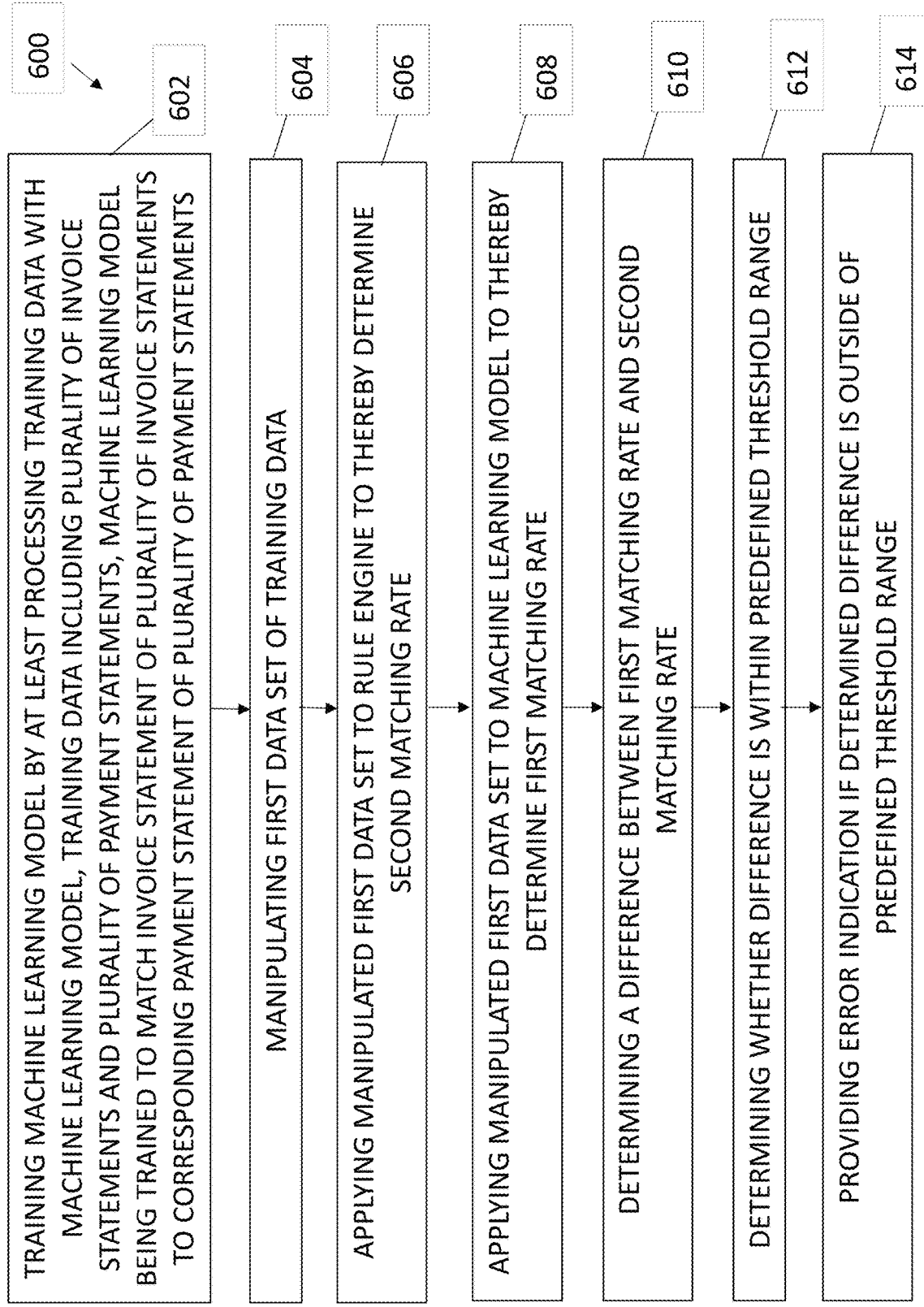
FIG. 6 depicts another flowchart illustrating a process for generating a process flow, in accordance with some example embodiments.

FIG. 6 depicts a flowchart of a process 600 for generating a process flow, in accordance with some example embodiments of the machine learning verification procedure described herein. At 602, a machine learning model can be trained by at least processing training data with the machine learning model. The training data can include a plurality of invoice statements and a plurality of payment statements. The machine learning model can be trained to match an invoice statement of the plurality of invoice statements to a corresponding payment statement of the plurality of payment statements. At 604, a first data set of the training data can be manipulated. In some embodiments, manipulating the first data set can include changing at least one parameter of at least one of the invoice statements and the payment statements. In addition, the at least one parameter can include one or more of an invoice amount, a payment amount, an invoice number, and a customer name.

At 606, the manipulated first data set can be applied to a rule engine to thereby determine a second matching rate. At 608, the manipulated first data set can be applied to the machine learning model to thereby determine a first matching rate. In some embodiments, the first matching rate can include a first number of matches between invoice statements of the plurality of invoice statements and payment statements of the plurality of corresponding payment statements within the first data set. In addition, the second matching rate can include a second number of matches between invoice statements of the plurality of invoice statements and payment statements of the plurality of corresponding payment statements within the second data set. In some embodiments, the predefined threshold range can include an acceptable difference between the first number of matches and the second number of matches.

At 610, a difference between the first matching rate and the second matching rate can be determined. At 612, a determination whether the difference is within a predefined threshold range can be made. At 614, an error indication can be provided if the determined difference is outside of the predefined threshold range. In some embodiments, the machine learning verification procedure can further include retraining the machine learning model if the determined difference is outside of the predefined threshold range.

Figure 7:
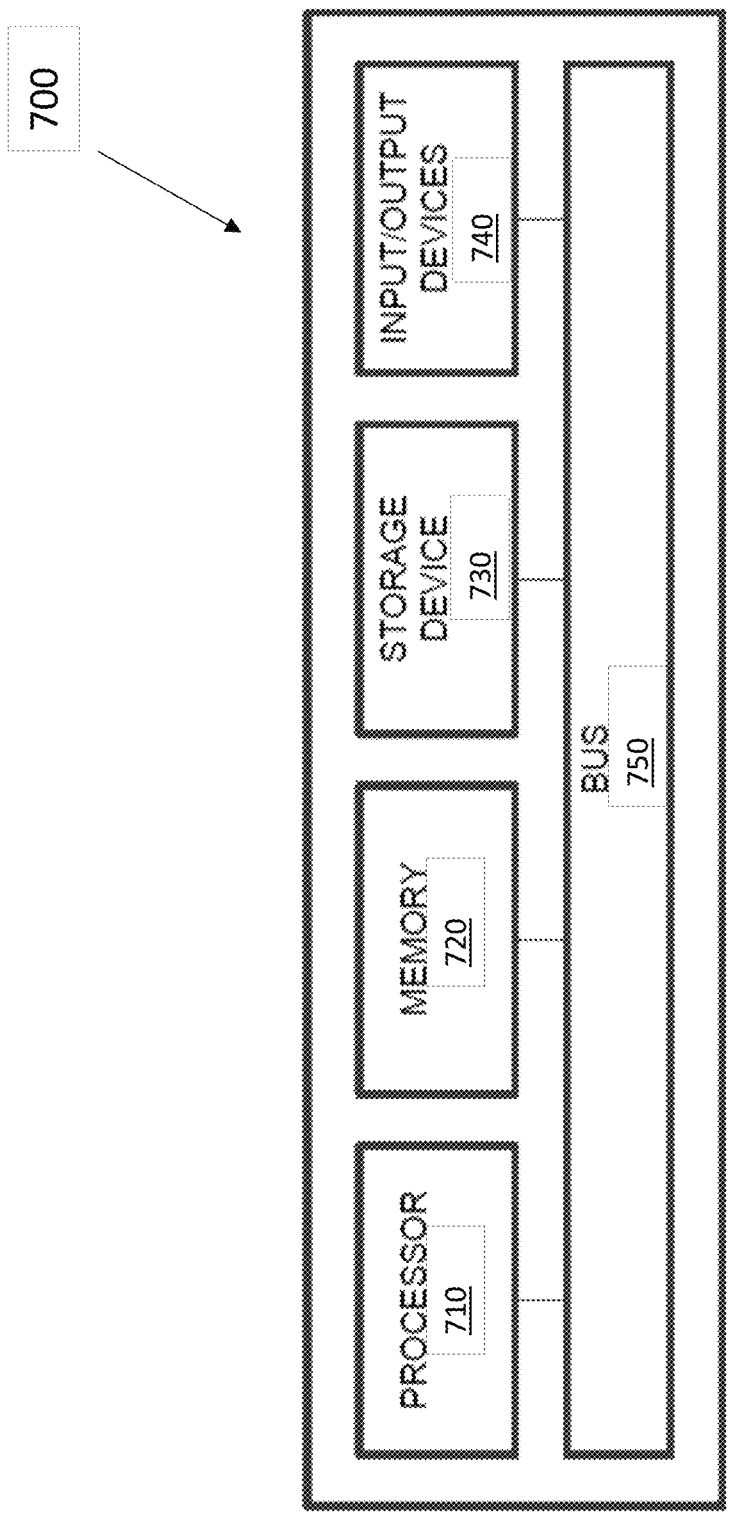
FIG. 7 depicts a block diagram illustrating a computing system, in accordance with some example embodiments.

FIG. 7 depicts a block diagram illustrating a computing system 700 consistent with implementations of the current subject matter. For example, referring to FIG. 1, the computing system 700 can be used to train and verify the machine learning model 102 using the machine learning verification procedure 100.

As shown in FIG. 5, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      training a machine learning model by at least processing training data with the machine learning model, the training data including a plurality of invoice statements and a plurality of payment statements, the machine learning model being trained to match an invoice statement of the plurality of invoice statements to a corresponding payment statement of the plurality of payment statements;

manipulating a first data set of the training data by changing at least one parameter of at least one of the invoice statements and the payment statements;

applying the manipulated first data set to the machine learning model to thereby determine a first matching rate, wherein the first matching rate includes a first number of matches between invoice statements of the plurality of invoice statements and payment statements of the plurality of corresponding payment statements within the first data set;

applying the manipulated first data set to a rule engine to thereby determine a second matching rate, wherein the second matching rate includes a second number of matches between invoice statements of the plurality of invoice statements and payment statements of the plurality of corresponding payment statements within the second data set;

determining a difference between the first matching rate and the second matching rate;

determining whether the difference is within a predefined threshold range; and providing an error indication if the determined difference is outside of the predefined threshold range.

2. The system of claim 1, wherein the predefined threshold range includes the difference between the first number of matches and the second number of matches.

3. The system of claim 1, wherein the operations further comprise retraining the machine learning model if the determined difference is outside of the predefined threshold range.

4. The system of claim 1, wherein the at least one parameter includes one or more of an invoice amount, a payment amount, an invoice number, and a customer name.

5. A computer-implemented method comprising:

training a machine learning model by at least processing training data with the machine learning model, the training data including a plurality of invoice statements and a plurality of payment statements, the machine learning model being trained to match an invoice statement of the plurality of invoice statements to a corresponding payment statement of the plurality of payment statements;

manipulating a first data set of the training data by changing at least one parameter of at least one of the invoice statements and the payment statements;

applying the manipulated first data set to the machine learning model to thereby determine a first matching rate, wherein the first matching rate includes a first number of matches between invoice statements of the plurality of invoice statements and payment statements of the plurality of corresponding payment statements within the first data set;

applying the manipulated first data set to a rule engine to thereby determine a second matching rate, wherein the second matching rate includes a second number of matches between invoice statements of the plurality of invoice statements and payment statements of the plurality of corresponding payment statements within the second data set;

determining a difference between the first matching rate and the second matching rate;

determining whether the difference is within a predefined threshold range; and providing an error indication if the determined difference is outside of the predefined threshold range.

6. The method of claim 5, wherein the predefined threshold range includes the difference between the first number of matches and the second number of matches.

7. The method of claim 5, further comprising retraining the machine learning model if the determined difference is outside of the predefined threshold range.

8. The method of claim 5, wherein the at least one parameter includes one or more of an invoice amount, a payment amount, an invoice number, and a customer name.

9. A non-transitory computer-readable medium storing instructions, which when executed by at least one data processor, result in operations comprising:

training a machine learning model by at least processing training data with the machine learning model, the training data including a plurality of invoice statements and a plurality of payment statements, the machine learning model being trained to match an invoice statement of the plurality of invoice statements to a corresponding payment statement of the plurality of payment statements;

manipulating a first data set of the training data by changing at least one parameter of at least one of the invoice statements and the payment statements;

applying the manipulated first data set to the machine learning model to thereby determine a first matching rate, wherein the first matching rate includes a first number of matches between invoice statements of the plurality of invoice statements and payment statements of the plurality of corresponding payment statements within the first data set;

applying the manipulated first data set to a rule engine to thereby determine a second matching rate, wherein the second matching rate includes a second number of matches between invoice statements of the plurality of invoice statements and payment statements of the plurality of corresponding payment statements within the second data set;

determining a difference between the first matching rate and the second matching rate;

determining whether the difference is within a predefined threshold range; and providing an error indication if the determined difference is outside of the predefined threshold range.

10. The non-transitory computer-readable medium of claim 9, wherein the predefined threshold range includes the difference between the first number of matches and the second number of matches.

11. The non-transitory computer-readable medium of claim 9, wherein the operations further comprise retraining the machine learning model if the determined difference is outside of the predefined threshold range.

12. The non-transitory computer-readable medium of claim 9, wherein the at least one parameter includes one or more of an invoice amount, a payment amount, an invoice number, and a customer name.

* * * * *